United States Patent [19]

Harada et al.

[11] Patent Number: 5,407,754

[45] Date of Patent: Apr. 18, 1995

[54] POTASSIUM HEXATITANATE FIBERS FOR USE AS REINFORCEMENT

[75] Inventors: Hidefumi Harada; Yasuo Inoue; Eiji Sadanaga, all of Yamaguchi, Japan

[73] Assignee: Titan Kogyo Kabushiki Kaisha, Japan

[21] Appl. No.: 901,231

[22] Filed: Jun. 19, 1992

[30] Foreign Application Priority Data

Jun. 20, 1991 [JP] Japan .................................. 3-148833
Feb. 6, 1992 [JP] Japan .................................. 4-21285

[51] Int. Cl.⁶ ...................... C01G 23/00; C04B 35/46; C22C 1/09
[52] U.S. Cl. ..................................... 428/614; 428/396; 428/375; 428/902; 423/598; 501/95; 501/134
[58] Field of Search ............... 428/614, 902, 375, 396; 423/598; 106/449; 501/95, 134

[56] References Cited

U.S. PATENT DOCUMENTS

| | | | |
|---|---|---|---|
| 3,779,784 | 12/1973 | Emslie | 106/449 |
| 3,956,006 | 5/1976 | Winter et al. | 106/419 |
| 4,265,872 | 5/1981 | Fujiki | 423/598 |
| 4,496,469 | 1/1985 | Morimoto et al. | 501/134 |
| 4,714,650 | 12/1987 | Obayashi et al. | 428/902 |
| 4,810,439 | 3/1989 | Fujiki et al. | 264/42 |
| 4,852,630 | 1/1989 | Hamajima et al. | 428/610 |
| 5,084,422 | 1/1992 | Harada et al. | 501/95 |

FOREIGN PATENT DOCUMENTS

| | | |
|---|---|---|
| 0323012 | 7/1989 | European Pat. Off. . |
| 59-207050 | 11/1984 | Japan . |
| 63-256526 | 10/1988 | Japan .................................. 423/598 |
| 63-260821 | 10/1988 | Japan . |
| 2-28250 | 1/1990 | Japan . |

OTHER PUBLICATIONS

Suganuma et al, "AA 6061 composite ... whisker", J. of Mat. Science Letter, 8 (1989) 808–810.

*Primary Examiner*—Gary P. Straub
*Assistant Examiner*—N. M. Nguyen
*Attorney, Agent, or Firm*—Cushman, Darby & Cushman

[57] ABSTRACT

Reinforcement potassium hexatitanate fiber having an average fiber length of 8–30 μm, an average fiber diameter of 0.2–0.7 μm and a specific surface area of 2–4 m²/g and a composite materials comprising the whiskers and a light alloy or thermoplastic resin. Also disclosed a process for producing the whiskers.

8 Claims, 1 Drawing Sheet

Fig. 1

POTASSIUM HEXATITANATE FIBERS FOR USE AS REINFORCEMENT

BACKGROUND OF THE INVENTION

This invention relates to potassium hexatitanate fibers useful as a reinforcement for plastics and light alloys. The invention also relates to a process for producing the fibers, as well as a metal-base composite material containing the fibers. More specifically, the invention relates to potassium hexatitanate fibers that at least have an average fiber length of 8–30 μm, an average fiber diameter of 0.2–0.7 μm and a specific surface area of 2–4 $m^2/g$, as well as a process for producing the fibers and a metal-base composite material containing them.

The invention also relates to potassium hexatitanate fibers that are low in the contents of impurities, in particular, niobium, and that will provide better performance when used as a reinforcement for a matrix light alloy; the invention further relates to a composite material that comprises the light alloy reinforced with those fibers. The invention also relates to a composite material that is reinforced with at least high-grade potassium hexatitanate whiskers having a total impurity content of no more than 0.3 wt %.

It has heretofore been known that potassium titanate fibers react vigorously with molten aluminum (see H. Fukunaga, M. Takeichi and N. Ohta, J. Jpn. Soc. Compos. mater. 8, 1982, 66). With a view to solving this problem, various attempts have been made and one proposal is potassium hexatitanate fibers having a tunnel structure that have a free potassium content of no more than 5 ppm (see Japanese Patent Public Disclosure No. 301516/1989). Those potassium titanate fibers are characterized in that the content of potassium titanate with a layered structure in potassium hexatitanate fibers having a tunnel structure is reduced to a very low level and the development of such potassium titanate fibers has motivated researchers to pay increasing attention to the potential use of those fibers as a reinforcement for light alloys that are intended to fabricate general-purpose engineering materials (see K. Suganuma, T. Fujita, K. Niihara, T. Okamoto and S. Suzuki; J. Mater. Sci. Letters, 8, 1989, 808).

However, those potassium titanate fibers have a high content of aggregates in the form of bundles ranging from 10 to 30 μm in diameter and, hence, metal-base composite materials reinforced with those fibers experience so great variations in mechanical strength that they have not been considered to be preferred engineering materials (see K. Suganuma et al.; Journal of the Japan Society of Powder and Powder Metallurgy, 8, 1990). Those potassium titanate fibers have the additional disadvantage of high reactivity with the magnesium component of light alloys (see K. Suganuma, T. Fujita, K. Niihara and N. Suzuki; The Proceedings of the 75th Autumun Conference of The Japan Institute of Light Metals, 1988, p.81). A further problem with the potassium titanate fibers is that if metal-base composite materials reinforced with them are heat-treated with a view to improving their mechanical strength and resistance to stress corrosion cracking, the strength is reduced rather than increased.

Furthermore, plastics reinforced with those potassium titanate fibers are not only poor in surface smoothness on account of the presence of the above-described aggregates in the form of bundles; the aggregates will also clog mold gates when miniature parts are to be formed using compounds incorporating those fibers. The term "aggregate" as used herein means a coherent mass of titanate fibers that have clustered together.

As described above, the conventional potassium hexatitanate fibers having a tunnel structure contain large amounts of aggregates which are difficult to disperse, so metal-base composite materials reinforced with those fibers experience great variations in mechanical strength, or plastics reinforced with those fibers are poor in surface smoothness which is one of the most important characteristics to be possessed by fiber-reinforced plastics. The potassium titanate fibers have the additional problem of high reactivity with light alloy components and metal-base composite materials reinforced with those fibers will suffer from the decrease in strength upon heat treatment. Because of these disadvantages, the prior art potassium hexatitanate fibers having a tunnel structure have not been preferred as a reinforcement for plastics and light alloys.

Another class of reinforcements conventionally known to be useful for producing composite materials are whiskers such as silicon carbide whiskers, silicon nitride whiskers, aluminum borate whiskers and potassium titanate whiskers but it is only the potassium titanate whiskers that are extensively used as reinforcements for general-purpose plastics and engineering plastics. This is because the price of the whiskers other than potassium titanate whiskers is exorbitant. Yet, compared to glass fibers and wollastonite which are extensively used as reinforcements for plastics, the price of potassium titanate whiskers is still high and this has put considerable limits on the applicability of composite materials containing potassium titanate whiskers. In order to expand the use of composite materials reinforced with potassium titanate whiskers and to upgrade the importance of those whiskers as reinforcements for plastics, it would be at least necessary to adopt new approaches such as developing potassium titanate whiskers that are as cheap as glass fibers or developing potassium titanate whiskers that can be produced at comparable costs to the prior art and which yet have higher strength.

Of the two approaches described above that are intended to produce inexpensive potassium titanate whisker reinforced plastics, the development of inexpensive potassium titanate whiskers has seen several improvements (see, :for example, Japanese Patent Public Disclosure Nos. 1615/1985 and 191019/1985). However, as regards the other approach, namely, increasing the strength of potassium titanate whiskers so as to develop a composite material that is inexpensive and that has high mechanical strength, no activities worth mention have ever been attempted.

As described above, composite materials containing the prior art potassium titanate whiskers have suffered from the problem that because of the high cost of the whiskers, the price of plastics filled with those whiskers must inevitably be set high and, as a result, the reinforced plastics have only found extremely limited utility. Under the circumstances, it has been desired to develop a novel composite material that is inexpensive and that has high strength.

SUMMARY OF THE INVENTION

An object, therefore, of the present invention is to provide potassium titanate fibers that are free from the defects of the conventional potassium hexatitanate fibers, that are inexpensive and that are capable of imparting consistently high mechanical strength and surface smoothness.

Another object of the present invention is to provide a process for producing those potassium titanate fibers.

A further object of the present invention is to provide a composite material containing those potassium titanate fibers.

DETAILED DESCRIPTION OF THE INVENTION

As a result of the intensive studies conducted in order to solve the aforementioned problems of the prior art, the present inventors found that preferred results were obtained with potassium hexatitanate fibers having the shape and specific surface area that are specified hereinafter. The present invention has been accomplished on the basis of this finding. Stated briefly, the present invention provides potassium hexatitanate fibers having an average fiber length of 8-30 μm, an average fiber diameter of 0.2-0.7 μm, and a specific surface area of 2-4 $m^2/g$.

The shape or morphology of the fibers is critical. If their average length and diameter are excessive, fiber masses will form and the aforementioned problems of the prior art cannot be solved. If the average fiber length and diameter are unduly small, the desired reinforcing effect of the fibers is not attained. The present inventors found that aggregation and other troubles could be prevented under the condition of synthesizing particles of the size specified above. It was further found that by enhancing the crystallinity of the comparatively short particles, their strength could be improved to enable the production of reinforcement potassium hexatitanate fibers that are satisfactory in terms of physical properties.

The potassium hexatitanate fibers of the present invention can be prepared by a process comprising the following steps:

baking at 950°-1100° C. a mixture of titanium and potassium feed compounds that are blended at such proportions as to give the general formula $K_2O \cdot nTiO_2$ (where n=3.5-4);

cooling the mixture down to 800° C. within 30 min. to form masses of potassium tetratitanate fibers;

dipping the masses of product in cold or warm water;

then, disintegrating the masses of potassium titanate fibers into individual single fibers by means of a high-shear mixer;

adding an acid to the slurry of the individual single fibers so as to adjust the pH value to 9.2-9.5, whereby the composition of the potassium titanate fibers is transformed in such a way that the molar ratio of $TiO_2/K_2O$ is in the range of 5.95-6.00;

subsequently adding a polymerie flocculant so as to coagulate the fibers, which are then subjected to solid-liquid separation;

baking the solids content at 950°-1050° C.; and washing the baked product with an acid.

A metal-base composite material reinforced with the potassium hexatitanate fibers of the present invention experiences only small variations in mechanical strength; further, a plastic composite material reinforced with those fibers has high strength and good surface smoothness.

If the potassium hexatitanate fibers have a total impurity content of no more than 0.3 wt % (which fibers are hereunder referred to as "high-grade potassium hexatitanate fibers"), there is achieved an additional advantage in that higher strength can be imparted by a subsequent heat treatment.

Examples of the titanium feed compound that can be used in the present invention include hydrated titanium oxides, titanium dioxide in anatase form, titanium dioxide in futile form, and futile ore. The potassium feed compound may be selected from among those compounds which generate $K_2O$ during sintering, as exemplified by $K_2O$, $KOH$, $K_2CO_3$ and $KNO_3$. In order to synthesize the high-grade potassium hexatitanate fibers, feed compounds of high purity must be used. Examples of effective feed compounds are titanium dioxide as produced by the chloride process but which are not subjected to a surface treatment with inorganic matters, and high-purity titanium oxides or hydrated titanium oxides with low impurity contents.

The titanium feed compound and the potassium feed compound are mixed in such proportions that n in the general formula $K_2O \cdot nTiO_2$ is in the range of 3.5-4. If n is smaller than 3.5, potassium dititanate fibers will form in addition to the potassium tetratitanate fibers being cooled. The potassium dititanate fibers are not preferred as a reinforcement since they are tubular in shape. As a furthe problem, if both potassium tetratitanate and potassium dititanate are present in the subsequent step of transforming the potassium titanate fibers in such a way that the molar ratio of $TiO_2/K_2O$ is in the range of 5.95-6.00, it is necessary to adjust the composition of each titanate to the intended range ($TiO_2/K_2O$ moler ratio=5.95-6.00) but this involves extreme difficulty in setting the conditions for adjustment and the reproducibility of good results is lowered. A further discussion of this situation is made below. If one attempts to adjust the composition of potassium tetratitanate to a $TiO_2/K_2O$ molar ratio of 5.95-6.00, the composition of potassium dititanate that may be present in addition to the potassium tetratitanate will undesirably exceed the upper limit of the indicated range. On the other hand, if one attempts to adjust the composition of potassium dititanate to a $TiO_2/K_2O$ molar ratio of 5.95-6.00, the composition of potassium tetratitanate will become smaller than the lower limit of the indicated range. As the mixing ratio of the titanium feed compound and the potassium feed compound becomes closer to 4 in terms of n in the general formula $K_2O \cdot nTiO_2$, the proportion of potassium dititanate fibers in the potassium tetratitanate fibers produced will decrease. However, it is difficult to eliminate the adverse effects of concomitant potassium dititanate merely by adjusting the mixing proportions of the feeds and this may be explained as follows: as already mentioned, if one attempts to adjust the composition of potassium tetratitanate to a $TiO_2/K_2O$ molar ratio of 5.95-6.00, the composition of concomitant potassium dititanate fibers will become greater than 6 in terms of the molar ratio of $TiO_2/K_2O$ and those fibers will decompose into titanium dioxide and potassium hexatitanate in the subsequent step of baking at 950°-1050° C. and work as a binder between other fibers during the decomposition to accelerate sintering. The sintered fibers are very difficult to disperse and if they are used as a reinforcement, they will cause adverse effects similar to those caused by the aforementioned bundles of aggregates.

Further, the fibers under consideration are multiphase crystals composed of titanium dioxide and potassium hexatitanate and, hence, they have only weak strength. As another problem, the potassium present at grain boundaries cannot be removed in the step of acid treatment and, if the fibers break when they are kneaded with a thermoplastic resin, said potassium will work as free potassium to decompose the thermoplastic resin. Yet another problem is the partial deficiency of potassium ions, which leads to the formation of titanium dioxide on the surfaces of potassium hexatitanate fibers; however, titanium dioxide has such high reactivity with light alloy components that it may prevent the desired improvement in the strength of light alloys due to fiber reinforcement or it can cause variations in the strength of the reinforced light alloys.

It should also be noted here that as the mixing ratio of the titanium feed compound and the potassium feed compound becomes closer to 4 in the terms of n in the general formula $K_2O.nTiO_2$, the length of the product fibers will decrease. It is generally held that the longer the fibers, the better the reinforcing effect. The fibers of the present invention are shorter than the conventional potassium titanate fibers; however, because of the substantial absence of bundles or masses, the fibers of the present invention are characterized by exhibiting a better reinforcing effect than the conventional potassium titanate fibers.

The additional formation of potassium dititanate can be prevented even if the mixing ratio of the titanium feed compound and the potassium feed compound is higher than 4 in terms of n in the general formula $K_2O.nTiO_2$. However, in this case, potassium hexatitanate also forms in the primary phase of potassium tetratitanate, thus making it difficult to disintegrate masses of fibers into individual single fibers.

In order to solve this problem, the present inventors conducted intensive studies and found the following: when the titanium feed compound and the potassium feed compound were baked as a mixture comprising them in such proportions that n in the general formula $K_2O.nTiO_2$ was limited to the range of 3.5–4, with the baked product being cooled from the reaction temperature down to 800° C. within 30 minutes, mass were obtained that could be disintegrated into individual single fibers by means of a high-shear mixer; secondly, in the step of liquid-solid separation subsequent to the disintegration of fiber masses in cold or warm water into single fibers, the component that existed as a melt at the baking temperature could be separated away from the fibers together with water. This may be stated more specifically as follows: when the mixing proportion of the titanium feed compound and the potassium feed compound is such that n in the general formula $K_2O.nTiO_2$ is in the range of 3.5–4, both potassium tetratitanate fibers and a liquid phase occur stably at the baking temperature but if the baked masses are cooled slowly, the liquid phase in the baked product will change to potassium dititanate fibers in the cooling process. However, if cooling from the baking temperature down to 800° C. is completed within 30 minutes, the liquid phase will not change to large crystals of potassium dititanate but it exists as an amorphous component in the baked product. In the step where the baked masses are immersed in cold or warm water to be disintegrated into individual single fibers, said amorphous component will be dispersed in the liquid as colloidal particles, which can be separated away from the fibers together with water in the subsequent step of solidified separation. The present inventors found that by adopting these procedures, potassium hexatitanate fibers could be obtained that were substantially free from the polycrystalline fibers made of titanium dioxide and potassium hexatitanate originating from potassium dititanate. As a result, the aforementioned problem could be solved.

In the case where the mixing proportion of the titanium feed compound and the potassium feed compound is less than 3.5 in terms of n in the general formula $K_2O.nTiO_2$, it is difficult to prevent the entrance of large potassium dititanate crystals into the baked masses even if the cooling rate is accelerated.

The titanium feed compound and the potassium feed compound are preferably mixed by a wet method rather than a dry method; in a wet method, the potassium feed compound is dissolved in a slurry of the titanium feed compound and, thereafter, the solution is either dried in a kneader or spray-dried; this method is preferred since the compositional inhomogeneity of the feed mixture is lessened. If the feed mixture does not have a homogeneous composition, the chance of the occurrence of potassium hexatitanate and potassium tetratitanate in addition to potassium dititanate will undesirably increase.

The baking temperature is preferably within the range of 950°–1100° C. If the baking temperature is lower than 950° C., the reaction will proceed so slowly that the potassium titanate fibers obtained are very short and it is difficult to disintegrate them into individual single fibers while, at the same time, the content of aggregates in bundle form will increase. If the baking temperature is higher than 1100° C., it is difficult to prevent the formation of potassium dititanate in the cooling process. As a further problem, potassium hexatitanate fibers will form in the primary phase, so the potassium titanate fibers obtained are difficult to disintegrate into individual single fibers and the content of aggregates in bundle form will increase. The baking time is typically in the range of 0.5–4 h, preferably 1–2 h.

The operation of disintegrating the baked masses into individual single fibers is performed by charging the baked product into an adequate amount of cold or warm water, immersing it for 1–5 h and agitating the slurry with a high-shear mixer. The pH value of the slurry at the time when this operation ends may vary with the slurry concentration but it is usually in the range of about 12–13. The slurry is a mixed phase of hydrated potassium tetratitanate and hydrated colloidal titanium oxides. The hydrated colloidal titanium oxides will behave together with water in the step of solid-liquid separation, whereby they are separated away from the fibers. In order to obtain potassium hexatitanate fibers as the final product, part of the potassium that is present between layers of the hydrated potassium tetratitanate must be removed so as to adjust the composition of the fibers to a $K_2O$ /$TiO_2$ molar ratio of 5.95–6.00. Therefore, an acid is added to the slurry in which the baked masses are disintegrated into individual single fibers, whereby pH value is adjusted to 9.2–9.5. If the pH value of the adjusted slurry is higher than 9.5, the $K_2O/TiO_2$ molar ratio of the fibers becomes smaller than 5.95 and even if the fibers are subjected to a subsequent step of heat treatment, residual potassium tetratitanate with a layered structure will remain, leading to an undesirably high content of free potassium in the final product. If the pH value of the adjusted slurry is lower than 9.2, potassium ions will be extracted so much from the hydrated potassium tetratitanate that titanium oxides will form on the surfaces of the potassium hexatitanate fibers which are the final product; as a result, the fibers become multiphase crystals, leading not only to smaller fiber strength but also to potassium confinement at the grain boundaries in the fibers. The confined potassium cannot be removed in the step of acid treatment and, when the fibers break when they are blended with a thermoplastic resin, the potassium present at the grain boundaries will work as free potassium to decompose the thermoplastic resin.

A further problem occurs when said potassium titanate fibers are used as a reinforcement for light alloys; titanium dioxide is so highly reactive with light alloy components that not only is the reinforcing effect of the fibers reduced but also increased variations will occur in the mechanical strength of the composite material reinforced with those fibers.

Various acids can be added for adjusting the pH value of the slurry and they include sulfuric acid, hydrochloric acid, nitric acid, phosphoric acid and acetic acid.

The fibers remain dispersed in the slurry at the time when the step of compositional transformation has ended. If those fibers are immediately subjected to solid-liquid separation for drying, many fibers that have aggregated into bundles will occur in the dried product. If the temperature for heat treatment to be performed in a subsequent step is low, the fiber aggregates in a bundle form will undergo no particular change and their dispersibility will not be deteriorated. However, the present inventors found that when those fibers are heat-treated at a high temperature exceeding 950° C. with a view to reducing the reactivity with light alloys and the content of free potassium, the fibers aggregated into bundles that were difficult to disperse. The present inventors therefore conducted intensive studies with a view to solving this problem; as a result, they found that aggregating the fibers by adding a conventionally known polymeric flocculant to the slurry at the time when the step of compositional transformation has ended contributed to reducing the content of fibers bundles in the dried product; a practical advantage of this phenomenon was that bundles of aggregates did not form in any substantial amount even when the dried product was heat-treated at high temperature. These findings enabled the present inventors to solve the problem described in this paragraph.

The solids content obtained by solid-liquid separation that is performed subsequent to the compositional transformation is preferably heated at a temperature in the range of 950°–1050° C. for a period that preferably ranges from 0.5 to 1 h. If the heating temperature is lower than 950° C., a small amount of potassium tetratitanate with a layered structure will remain in the interior of the fibers, so if the fibers break when they are composited with resins or light alloys, free potassium will come out of the fractured surface and decompose the resins. In addition, the fibers have not only a large specific surface area but also a large crystallite diameter; therefore, the fibers have poor crystallinity and undesirably tend to react in an easy way. If the heating temperature is higher than 1050° C., the fibers start to be sintered and their dispersibility will deteriorate.

The crystallinity of the fibers can be quantitated by measuring their specific surface area. As already discussed, the potassium hexatitanate fibers of the present invention are synthesized by a process comprising steps of first synthesizing potassium tetratitanate in the primary phase, then adjusting the composition of the potassium tetratitanate fibers to that of potassium hexatitanate fibers by ion exchange, and finally transforming the crystal structure of those fibers from a layered structure to a tunnel structure by heating. It is generally known that the specific surface area, as measured by the BET method, of potassium tetratitanate fibers having a layered structure is 3 to 4 times as large as the value for potassium hexatitanate fibers having a tunnel structure that have the same morphology and dimensions. On the basis of this fact, the value of the specific surface area of heated fibers as measured by the BET method can be used as an index for the degree by which the crystal structure of the fibers undergoes transformation from a layered structure to a tunnel structure upon heating, namely, as an index for the crystallinity of potassium hexatitanate fibers.

The reason why the specific surface area, as measured by the BET method, of potassium tetratitanate fibers having a layered structure is considerably larger than the value for potassium hexatitanate fibers with a tunnel structure that have the same morphology and dimensions would be that nitrogen gas is trapped between layers in the crystal structure of potassium tetratitanate fibers.

The crystallinity of the fibers can also be quantitated by measuring their crystallite diameter. The crystallite diameter may be determined by a known technique, such as by X-ray diffraction using the Seherrer equation on the basis of a (200) diffraction line perpendicular to the direction of fiber extension. The specific surface area and the crystallite diameter are both a measure of crystallinity and they are related by the fact that the crystallite diameter increases as the specific surface area decreases. The fibers of the present invention will exhibit the intended effect if their crystallite diameter is at least 650 Å.

Acid washing is a step in which the free potassium that has migrated from the interior of the fibers to the surface as a result of heat treatment is removed, and it is performed by adding an acid to the slurry having the fibers dispersed in cold or warm water, whereby the pH value of the slurry is adjusted to 7 or below, preferably between 3 and 5.

The potassium hexatitanate fibers produced by the process of the present invention have an average fiber length of 8–30 $\mu$m, an average fiber diameter of 0.2–0.7 $\mu$m, a specific surface area of 2–4 $m^2/g$, and are substantially free of potassium tetratitanate and aggregates of potassium hexatitanate.

A metal-base composite material that is reinforced with the potassium hexatitanate fibers of the present invention has high reliability as an engineering material in the presence of only limited variations in mechanical strength. The present invention also provides a process for producing the high-grade potassium titanate fibers with smaller contents of impurities and a metal-base composite material that is reinforced with such high-grade potassium hexatitanate fibers are not only low in variations in mechanical strength but also its strength is further enhanced by heat treatment, with the attendant advantage of high thermal stability. The conventional potassium titanate fibers as a reinforcement are synthesized from starting materials that have high contents of impurities such as niobium, aluminum, phosphorus, calcium, magnesium, iron and silica, as exemplified by titanium oxide in anatase form produced by the sulfate process, metatitanic acid, and naturally occurring futile sand or anatase sand. Potassium titanate fibers synthesized from these starting materials contain large amounts of impurities and, even if they are baked at elevated temperatures to reduce their specific surface area with a view to lowering the surface activity, it is difficult to insure that a light alloy reinforced with those potassium hexatitanate fibers will not experience a drop in strength upon heat treatment. A particularly great adverse effect is caused by elements having a valency other than four if they are dissolved as impurities in the crystal structure of potassium titanate. The lower the contents of impurities, the better the characteristics of a light alloy that is reinforced with the fibers of interest. It should, however, be noted that there will be no particular problems if the niobium content is no more than 0.1% in terms of $Nb_2O_5$ and if the total content of impurities is no more than 0.3% in terms of oxides.

Examples of the light alloy that can be used in the present invention are aluminum alloys such as those based on Al—Mg, Al—Mn, Al—Si, Al—Mg—Si, Al—Cu, Al—Cu—Si and Al—Cu—Mg—Ni systems. Common aluminum alloys can be used without any problem. Magnesium alloys may also be used.

The potassium hexatitanate fibers can be composited with light alloys by any known methods including a powder metallurgical method and a squeeze-casting method. If composite materials are to be produced by a squeeze-casting method, a fiber preform must be formed preliminarily. If this is tile case, a sintered fiber preform is preferably used in place of a fiber preform that is prepared with an inorganic binder being added, and the reason is as follows: if a fiber preform is prepared using an inorganic binder, the latter will react with the potassium titanate fibers to reduce their strength and reinforcing effect inherent in the fibers cannot be effectively imparted to light alloys; furthermore, the high reactivity of the inorganic binder with alloy components will lead to uneven presence of the alloy components or they will interfere with the formation of intermetallic compounds that affect the intended improvement in the strength of the matrix, whereby the desired effectiveness of heat treatment cannot be easily attained.

A sintered preform can be prepared in the following manner: an organic binder is added to a reinforcing material containing potassium titanate; after blending, the mixture is baked at a temperature of 800°–1100° C., whereupon the potassium titanate fibers are sintered to an adequate extent, thereby yielding a melt casting preform having satisfactory characteristics.

The potassium hexatitanate fibers and a light alloy are used in such proportions that the volume fraction of the potassium hexatitanate fibers is in the range of 5–404. If the volume fraction of the potassium hexatitanate fibers is less than 5%, their effectiveness in reinforcing the matrix alloy is very small. If, on the other hand, the volume fraction of the potassium hexatitanate fibers is more than 40%, lesser improvement is achieved in strength as the volume fraction of the potassium hexatitanate fibers increases. In addition, an increasing use of the potassium hexatitanate fibers results in a higher cost of composite materials.

When producing a metal-base composite material in accordance with the present invention, various conventional reinforcements may be used in combination with the potassium hexatitanate fibers described above and they include short alumina fibers, short crystalline alumina/silica fibers, silicon carbide whiskers, silicon nitride whiskers, aluminum borate whiskers, long alumina fibers, carbon fibers, silicon carbide fibers and tyranno fibers. Using these fibers or whiskers in combination with the potassium hexatitanate fibers is effective in further improving the strength of the composite material reinforced with the potassium hexatitanate fibers of the present invention, or improving its wear resistance or further lowering its thermal expansion.

The high-grade potassium hexatitanate fibers of the present invention are described below in greater detail. Conventional potassium titanate whiskers contain incidental impurities, such as niobium, phosphorus, aluminum, silicon, iron and alkaline earth metals, that derive from the starting materials for their manufacture. The present inventors found that because of those impurities, only whiskers of low strength could be obtained and the present invention has been accomplished on the basis of this finding. Conventional potassium titanate whiskers are synthesized from those starting materials which have high contents of niobium and other impurities, as exemplified by titanium oxide in anatase form which is produced by the sulfate process, metatitanic acid, and naturally occurring rutile sand or anatase sand, and the potassium titanate whiskers synthesized from those starting materials have contained large amounts of impurities. Thus, the present inventors found the following: first, the mechanical strength of plastics reinforced with potassium titanate whiskers are closely related to the contents of impurities in the potassium titanate whiskers; secondly, composite materials with markedly improved mechanical strength can be obtained by reinforcing plastics with potassium hexatitanate whiskers having low impurity contents. The present invention has been accomplished on the basis of these findings. In short, it is according to another aspect of the present invention to provide a whisker reinforced composite material that uses reinforcement high-grade potassium hexatitanate whiskers that have a total impurity content of no more than 0.3 wt %.

The potassium titanate whiskers to be used in the present invention are high-grade potassium hexatitanate whiskers having a tunnel structure that have a total impurity content of no more than 0.3%. In a particularly desired case, they are single-crystal whiskers that contain neither potassium titanate of a layered structure nor titanium oxide in the interior or on the surface of crystal.

The high-grade potassium titanate whiskers to be used in the present invention are typically produced by the following process. First, a titanium feed compound and a potassium feed compound are blended in such proportions as to provide a composition represented by the general formula $K_2O.nTiO_2$ (n=2–4); the resulting mixture is baked at 900°–1100° C. to yield mass of potassium titanate whiskers; the mass of potassium titanate whiskers are dipped in cold or warm water so that they are disintegrated into individual single whiskers; thereafter, an acid is added to the slurry of individual single whiskers and its pit is adjusted to between 9.3 and 9.7, whereby the composition of potassium titanate whiskers is transformed to a $TiO_2/K_2O$ molar ratio of 5.9–6.0; subsequently, the whiskers are heated at 900°–1150° C. for at least 1 h; finally, the whiskers are washed with an acid.

Examples of the titanium feed compound that can be used to produce the high-grade potassium titanate whiskers include hydrated titanium oxides with small impurity contents and titanium dioxide. The potassium feed compound may be selected from among those compounds which generate $K_2O$ during sintering, as exemplified by $K_2O$, KOH, $K_2CO_3$ and $KNO_3$. Among the impurities contained in the feed compounds, those which react with potassium to form water-soluble compounds as exemplified by aluminum, silicon, zinc and phosphorus can be partly dissolved away in water in the step of immersing the synthesized masses of potassium titanate whiskers in cold or warm water so that they are disintegrated into individual single whiskers. It should, however, be noted that when taking this approach, the components that have dissolved into water are preferably removed by solid-liquid separation before an acid is added to the slurry of individual single whiskers. The total content of impurities in the potassium titanate whiskers is desirably no more than 0.3 wt % in terms of oxides and it is particularly to be noted that the niobium content is desirably no more than 0.1 wt % in terms of $Nb_2O_5$. If the total content of impurities exceeds 0.3 wt %, the strength of the whiskers will drop to an undesirably low level. The drop in the mechanical strength of the potassium titanate whiskers is particularly great in the case where elements having a valency other than four or those elements which have ionic radii that differ from that of $Ti^{4+}$ by at least 10% are dissolved in the crystal structure of the whiskers. When producing a composite material that uses a thermoplastic resin, it is preferred to use high-grade potassium titanate whiskers that have an average length of at least 5 μm and an average aspect ratio (the ratio of average length to average diameter) of at least 10.

The thermoplastic resin for use in the present invention include general use plastics such as polypropylene, ABS, and vinyl chloride resins; engineering plastics such as polyamide, polyacetal, polyethylene terephthalate, polybutylene terephthalate, polyphenylene sulfide, polycarbonate, and liquid crystal polymers; and alloys thereof. The thermoplastic resins used in common can be freely used as desired.

The plastics and the potassium hexatitanate whiskers are mixed at such a ratio that the potassium hexatitanate whiskers are incorporated at a weight fraction of from 3 to 50%. If the potassium hexatitanate whiskers is insufficiently added as to account for less than 3% by weight, the reinforcing effect to be imparted to the plastics becomes too little, whereas an addition thereof in excess as to exceed 50% by weight not only impairs the moldability of the mixture but also leads to the formation of a costly composite material.

In the production of the composite material according to the present invention, it is preferred to use potassium titanate whiskers which is treated with a surface-treating agent such as a silane coupling agent. The potassium titanate whiskers can be incorporated into the composite material by either using potassium titanate whiskers having been surface-treated in advance, or adding the surface treating agent at the kneading step of potassium titanate whiskers with plastics. It is preferred, however, to use potassium titanate whiskers which have previously been subjected to surface treatment because the effect of the surface-treating agent can be more fully exhibited.

The silane coupling agent suitable for use in the present invention include, for example, amino-type silane coupling agents such as γ-aminopropyl triethoxysilane and N-(β-aminoethyl)-γ-aminopropyl trimethoxysilane; epoxy-type silane coupling agents such as γ-glycidyloxypropyl trimethoxysilane and β-(3,4-epoxycyclohexyl)ethyltrimethoxysilane; vinyl-type silane coupling agents such as vinyltrimethoxysilane, vinyltriethoxysilane, and vinyl-tris(2-methoxyethoxy)silane; mercapto-type silane coupling agents such as γ-mercaptopropyl trimethoxysilane; and acrylic silane coupling agents such as γ-methacryloxypropyl trimethoxysilane. An amount of those silane coupling agents is preferably 2.0% by weight or less with respect to the potassium titanate whiskers. An addition in excess does not provide further improvement.

The composite material according to the present invention may contain depending on the purpose, one or more of various types of additives such as fire retardants, thermal stabilizers, and lubricants, in a range that their addition does not impair the properties inherent in the composite material. Otherwise, other fillers may be added with an aim to impart the desired properties to the composite. Because the potassium titanate whiskers according to the present invention exhibit considerably improved mechanical strength as compared with the conventional whiskers, a lower quantity can be added to plastics to obtain a comparative effects. Furthermore, a composite having a mechanical strength far higher than any using conventional potassium titanate whiskers can also be realized.

The present invention is described in further detail below referring to some Examples. However, it should not be construed to be limiting the scope of the invention. In the following examples, all percentages and parts are by weight unless otherwise stated.

EXAMPLE 1

Titanium dioxide in anatase form (1400 g) and potassium carbonate (650 g) were weighed. After adding 7 l of water, the mixture was agitated well to have potassium carbonate dissolved. The resulting slurry was spray-dried with the inlet and outlet temperatures being adjusted at 270°–280° C. and 80°–85° C., respectively.

Then, the dried product was put into an alumina crucible and baked in an electric furnace as the temperature was raised to 1000° C. at a rate of 250° C./h and held at that temperature for 1 h. Thereafter. the temperature was lowered to 800° C. over 20 minutes and subsequently lowered to room temperature at a rate of 200° C./h.

The baked product was put into 15 l of warm water in a stainless steel container and immersed in it for 5 h. After agitation with a T.K. homomixer (high-shear mixer of Tokushu Kita Kogyo Co., Ltd. rotating at 4000 rpm; unless otherwise noted, the rotating speed of the homomixer shall be the same for 1 h, the bath temperature was adjusted to 60° C. By dropwise addition of 5N-HCl, the pH value of the bath was adjusted to 9.3. Upon further agitation, potassium ions would dissolve out from between layers of potassium tetratitanate, leading to an increase in the pH value of the bath. Under the circumstances, the pH value was adjusted to 9.3 by adding HCl dropwise at 30-min intervals until the value would no longer increase by more than 0.1 when agitation was continued for 30 minutes after the dripping of HCl. The potassium titanate fibers were coagulated by adding a polymeric flocculant (available from HYMO Corp. under the trade name "Himolock MP-173H") in an amount of 0.2 wt % of the fibers.

After filtration and washing, the fibers were baked at 1000° C. for 1 h. The baked product was put into 10 l of warm water and stirred with a T.K. homomixer for 30 minutes to disperse the fibers. By adding 1N HCl dropwise, the pH value of the slurry was adjusted to 4. By subsequent filtration, washing and drying, potassium hexatitanate fibers were obtained. Identification by X-ray diffraction showed that the fibers were single phase of potassium hexatitanate. No other phase to speak of was found even by examination with an analytical electron microscope. Examination with a scanning electron microscope showed that the fibers had an average length of 11 μm and an average diameter of 0.4 μm. The specific surface area of the fibers as measured by the BET method was 3.3 m$^2$/g. With constant K in the Scherrer equation being taken as 0.9, the crystallite diameter was determined from a (200) diffraction line; it was 680 Å.

By ehemleal analysis, the potassium titanate fibers were found to contain various impurities such as 0.384% $Nb_2O_5$, 0.007% $Fe_{23}$, 0.010% MgO, 0.085% CaO, 0.025% $Al_2O_3$, 0.012% ZnO, 0.009% $P_2O_5$, and 0.006% $SiO_2$. The purity of the fibers was 99.4%.

The potassium titanate fibers were added to water to give a concentration of 150 g/l and, further, a dispersant (available from San Nopeo Co., Ltd. under the trade name "Nopeosant RFA") was added in an amount of 0.1 wt % of the potassium titanate fibers and the mixture was agitated with a T.K. homomixer for 30 minutes to have the fibers dispersed. Thereafter, polyvinyl alcohol (available from Kurarax Co., Ltd. under the trade name "Kuraray Poval 205") in an amount equivalent to 8.0 wt % of the potassium titanate fibers, and the mixture was put into a PVC mold and subjected to filtration by suction to yield a shaped part. The part was transferred from the PVC mold to a metal mold. and compressed to achieve a fiber volume fraction of 30%. The compressed part was taken out of the metal mold, dried and heated at 950° C. to yield a sintered preform.

The sintered preform was preheated at ca. 700° C. and replaced in a metal mold that had been heated at 350° C. A molten of ADC 12 (JIS) was poured into the mold at ca. 700° C. and, immediately thereafter, the melt was rapidly cooled to solidify at a controlled pressure of 1000 Kg/cm$^2$, thereby producing a composite material.

Comparative Example 1

Titanium dioxide in anatase form (1400 g) and potassium carbonate (650 g) were dry-mixed. The resulting mixture was put into an alumina crucible and baked in an electric furnace as the temperature was raised to 1000° C. at a rate of 250° C./h and held at that temperature for 1 h. Thereafter, the temperature was lowered to room temperature at a rate of 200° C./h.

The baked product was put into 15 l of warm water in a stainless steel container and immersed in it for 5 h. Thereafter, agitation was started at 600 rpm and the temperature of the bath was &djusted to 60° C. By dropwise addition of 5N-HCl, the pit value of the bath was adjusted to 9.5. Upon further agitation, potassium ions would dissolve out from between layers of potassium tetratitanate, leading to an increase in the pH value of the bath. Under the circumstances, the pH value was adjusted to 9.5 by adding HCl dropwise at 30-min intervals until the pH value would not increase by more than 0.1 when agitation was continued for 30 minutes after tile dripping of HCl.

After filtration, the fibers were baked at 1000° C. for 1 h. The baked product was put into 10 l of warm water and stirred with a T.K. homomixer for 30 minutes to disperse the fibers. By adding 1N HCl dropwise, the pH value of the slurry was adjusted to 4. By subsequent filtration, washing and drying, potassium hexatitanate fibers were obtained. Identification by X-ray diffraction showed that the fibers were single phase of potassium hexatitanate. However, examination with an analytical electron microscope revealed the presence of fibers that were substantially free of potassium. Examination with a scanning electron microscope showed that the product fibers had an average length of 13 μm and an average diameter of 0.4 μm. The specific surface area of the fibers as measured by the BET method was 4.3 m$^2$/g. With constant K in the Shefret equation being taken as 0.9, the crystallite diameter was determined from a (200) diffraction line; it was 630 Å.

A sintered preform having a fiber volume fraction of 304 was prepared by the same technique as used in Example 1. The prepared sintered preform was reheated at ca. 700° C. and replaced in a metal mold that had been heated at 350° C. A molten of ADC 12 (JIS) was poured into the mold at ca. 700° C. and, immediately thereafter, the melt was rapidly cooled to solidify at a controlled pressure of 1000 Kg/cm$^2$, thereby producing a composite material.

Comparative Example 2

Potassium hexatitanate fibers were obtained by repeating the procedure of Comparative example 1 except that the baked product immersed in 15 l of warm water in the stainless steel container for 5 h was agitated with a T.K. homomixer (high-shear mixer of Tokushu Kita Kogyo Co., Ltd.) for 1 h, followed by adjusting the temperature of the bath to 60° C.

Upon examination with a scanning electron microscope, the fibers were found to have an average length of 12 μm and an average diameter of 0.4 μm. The specific surface area as measured by the BET method was 4.4 m$^2$/g. With constant K in the Scherrer equation being taken as 0.9, the crystalline diameter was determined from a (200) diffraction line; it was 630 Å.

A sintered preform having a fiber volume fraction of 30% was prepared by the same technique as used in Example 1. The prepared sintered preform was preheated at ca. 700° C. and replaced in a metal mold that had been heated at 350° C. A molten. of ADC 12 (JIS) was poured into the mold at 700° C. and, immediately thereafter, the melt was rapidly cooled to solidify at a controlled pressure of 1000 Kg/cm$^2$, thereby producing a composite material.

Reference Example 1

A sintered preform was prepared under the same conditions as adopted in Example 1 except that potassium titanate whiskers ("TISMO N" of Ohtsuka Chemical Co., Ltd.) were used. By chemical analysis, the potassium titanate whiskers were found to contain various impurities such as 0.120% $Nb_2O_5$, 0.010% $Fe_2O_3$, 0.027% MgO, 0.111% CaO, 0.062% $Al_2O_3$, 0.001% ZnO, 0.089% $P_2O_5$ and 0.005% $SiO_2$. The purity of the whiskers was 99.5%. Identification by X-ray diffraction showed that the whiskers were a two-phase mixture composed of potassium hexatitanate and titanium dioxide. Examination of the whiskers with a scanning electron microscope showed that they had an average length of 10 μm and an average diameter of 0.4 μm. The specific surface area of the whiskers as measured by the BET method was 7.2 m$^2$/g. The crystallite diameter as determined from a (200) diffraction line using the Scherrer equation was 405 Å.

The sintered preform was preheated at 700° C. and replaced in a metal mold that had been heated at 350° C. A molten of ADC 12 (JIS) was poured into the mold at ca. 700° C. and, immediately thereafter, the melt was rapidly cooled to solidify at a controlled pressure of 1000 Kg/cm$^2$, thereby producing a composite material.

Reference Example 2

A sintered preform was prepared under the same conditions as adopted in Reference Example 1 except that potassium titanate whiskers ("TOFICA Y" of Nippon Whiskers Co., Ltd.) were used. By chemical analysis, the potassium titanate whiskers were found to contain various impurities such as 0.222% $Nb_2O_5$, 1.487% $Fe_{23}$, 0.008% NiO, 0.034% MnO, 0.073% MgO, 0.053% CaO, 0.276% $Al_2O_3$, 0.011% ZnO, 0.131% $P_2O_5$, and 0.010% $SiO_2$. The purity of the whiskers was 97.1%. Identification by X-ray diffraction showed that the whiskers were a two-phase mixture composed of potassium hexatitanate and titanium dioxide. Examination of the whiskers with a scanning electron microscope showed that they had an average length of 12 μm and an average diameter of 0.4 μm. The specific surface area of the whiskers as measured by the BET method was 8.3 m$^2$/g. The crystallite diameter as determined from a (200) diffraction line using the Scherrer equation was 365 Å.

The sintered preform was preheated at 700° C. and replaced in a metal mold that had been heated at 350° C. A molten of ADC 12 (JIS) was poured into the mold at ca. 700° C. and, immediately thereafter, the melt was rapidly cooled to solidify at a controlled pressure of 1000 Kg/cm2, thereby producing a composite material.

The composite materials produced in Example 1, Comparative Examples 1 and 2 and Reference Examples 1 and 2 were machined to prepare specimens for a tensile test. The shape of the specimens is shown diagrammatically in FIG. 1. The results of measurements of tensile strength at ordinary temperatures are shown in Table 1 below.

TABLE 1

| Run | Tensile Strength (MPa) | Weibull Coefficient |
| --- | --- | --- |
| Example 1 | 398 | 59 |
| Comparative Example 1 | 362 | 20 |
| Comparative Example 2 | 375 | 27 |
| Reference Example 1 | 324 | 21 |
| Reference Example 2 | 315 | 18 |

*No. of specimens* 12

As is clear from Table 1, the composite material reinforced with the potassium hexatitanate fibers produced in accordance with the present invention not only had high strength but also experienced very small variations in strength. Examination under a scanning electron microscope of the fractured surfaces of the specimens prepared in Comparative Examples 1 and 2 showed the presence of many aggregates ranging from 10 to 30 μm in diameter. In contrast, no such aggregates were observed in the fractured surface of the specimen prepared in Example 1. Further, the area around the interface between the matrix and the composited portion of each composite material was examined by EPMA; a Mg-rich portion was found in the composite materials of Comparative Examples 1 and 2, with the MK content decreasing toward the interior of the composite portion. On the other hand, no significant segregation of light metal components was found to occur in the composite material of Example 1 and there was no particular difference in the Mg content between the exterior and the interior of the composited portion.

The composite materials of Reference Examples 1 and 2 had a much lower strength than the composite materials of Example 1 and Comparative Examples 1 and 2 and this would be explained by the following two reasons: the potassium titanate whiskers had a high content of aggregates; and those whiskers also had a high content of titanium dioxide which was more reactive with metals than potassium hexatitanate.

EXAMPLE 2

High-grade potassium hexatitanate fibers were synthesized by repeating the procedure of Example 1 except that a high-purity titanium oxide commercially available from Titan Kogyo Kabushiki Kaisha was used as the titanium feed compound. Identification by X-ray diffraction showed that the fibers were composed of a single phase of potassium titanate. Examination of the fibers with a scanning electron microscope showed that they had an average length of 21 μm and an average diameter of 0.5 μm. The specific surface area as measured by the BET method was 2.8 m$^2$/g. The crystallite diameter was measured from a (200) diffraction line using the Scherrer equation and it was 760 Å. By chemical analysis, the potassium titanate fibers were found to contain various impurities such as 0.021% $Nb_2O_5$, 0.003% $Fe_{23}$, 0.008% MgO, 0.024% CaO, 0.005% $Al_2O_3$, 0.008% AnO, 0.005% $P_2O_5$ and 0.004% $SiO_2$. The purity of the fibers as 99.9%.

A sintered preform having a fiber volume fraction of 20% was prepared by the same technique as adopted in Example 1. The prepared sintered preform was preheated at ca. 800° C. and replaced in a metal mold that had been heated at 350° C. A molten of AC 8A (JIS) was poured into the mold at ca. 800° C. and, immediately thereafter, the melt was rapidly cooled to solidify at a controlled pressure of 1000 Kg/cm$^2$, thereby producing a composite material.

EXAMPLE 3

Potassium hexatitanate fibers were produced by repeating the procedure of Example 1 except that the feed compounds were baked at 1050° C. identification by X-ray diffraction showed that the fibers were composed of a single phase of potassium hexatitanate. Examination of the fibers with a scanning electron microscope showed that they had an average length of 20 μm and an average diameter of 0.5 μm. The specific surface area as measured by the BET method was 2.7 m$^2$/g. The crystallite diameter was determined from a (200) diffraction line using the Scherrer equation and it was 770 Å. By chemical analysis, the potassium titanate fibers were found to have a purity of 99.4%.

A sintered preform having a fiber volume fraction of 25% was prepared by the same technique as adopted in Example 1. The prepared sintered preform was preheated at ca. 800° C. and replaced in a metal mold that had been heated at 350° C. A molten of AC 8A (JIS) was poured into the mold at ca. 800° C. and,m immediately thereafter, the melt was rapidly cooled to solidify at a controlled pressure of 1000 Kg/cm$^2$, thereby producing a composite material.

The composite materials produced in Examples 2 and 3 were machined to prepare specimens for tensile test.

Figure 1:
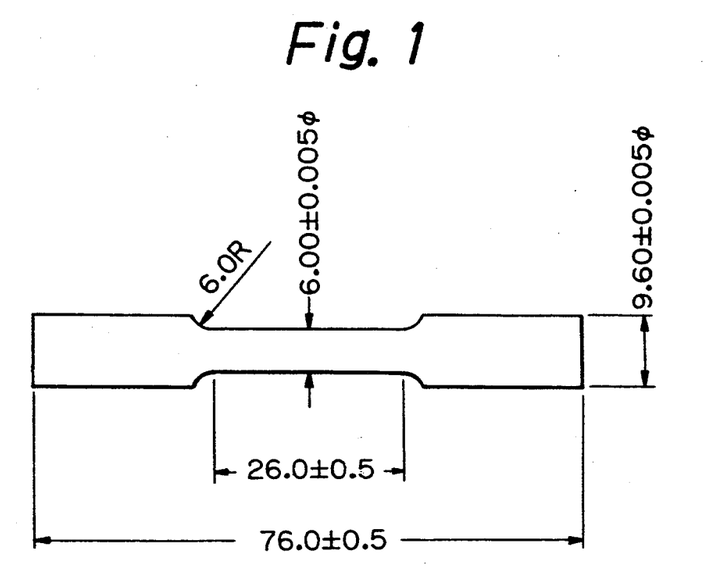
FIG. 1 is a diagram showing a dumbbell-shaped specimen for use in a tensile test.

The shape of the specimens is shown diagrammatically in FIG. 1.

Measurements of tensile strength at ordinary temperatures were conducted both before and after T6 heat treatment (solution heat treatment at 510°×4 h, followed by quenching in water and artificial aging treatment at 170° C.×10 h). The test results are shown in Table 2 below.

TABLE 2

| Run | Tensile Strength(MPa) | |
|---|---|---|
| | Before heat treatment | After heat treatment |
| Example 2 | 391 | 425 |
| Example 3 | 382 | 367 |

As is clear from Table 2, the strength of the composite materials reinforced with potassium hexatitanate fibers of high purity was further enhanced by heat treatment. The Weibull coefficient of tensile strength test was 60 for the composite material of Example 2 before the heat treatment and 54 for the composite material of Example 3 before the heat treatment. These values did not change greatly even after the heat treatment and, thus, the composite materials of both Examples 2 and 3 experienced only small variations in strength.

Comparative Example 3

Potassium hexatitanate fibers were produced by repeating the procedure of Example 2 except that the temperature for heating subsequent to the compositional transformation was adjusted to 900° C. Identification by X-ray diffraction showed that the fibers were composed of a single phase of potassium hexatitanate. Examination of the fibers with a scanning electron microscope showed that they had an average length of 20 μm and an average diameter of 0.5 μm. The specific surface area as measured by the BET method was 5.3 m$^2$/g. The crystallite diameter was determined from a (200) diffraction line using the Scherrer equation and it was 555 Å.

Comparative Example 4

Potassium hexatitanate fibers were produced by repeating the procedure of Example 2 except that the temperature for heating subsequent to the compositional transformation was adjusted to 800° C. Identification by X-ray diffraction showed that the fibers were composed of a single phase of potassium hexatitanate. Examination of the fibers with a scanning electron microscope showed that they had an average length of 20 μm and an average diameter of 0.5 μm. The specific surface area as measured by the BET method was 6.4 m$^2$/g. The crystallite diameter was determined from a (200) diffraction line using the Scherrer equation and it was 435 Å.

A sintered preform having a fiber volume fraction of 20% was prepared by the same technique as adopted in Example 1. The prepared sintered preform was preheated at ca. 800° C. and replaced in a metal mold that had been heated at 350° C. A molten of AC 8A (JIS) was poured into the mold at ca. 800° C. and, immediately thereafter, the melt was rapidly cooled to solidify at a controlled pressure of 1000 Kg/cm$^2$, thereby producing a composite material.

The composite materials produced in Comparative Examples 3 and 4 were machined to prepare specimens for a tensile test that were of the shape shown in FIG. 1.

The results of a test conducted to measure the tensile strength at ordinary temperatures after T6 heat treatment (solution heat treatment at 510° C.×4 h, followed by quenching in water and artificial aging treatment at 170° C.×10 h) are shown in Table 3 below.

TABLE 3

| Run | Tensile Strength(MPa) | Weibull Coefficient |
|---|---|---|
| Comparative Example 3 | 365 | 26 |
| Comparative Example 4 | 348 | 22 |

As is clear from Table 3, the composite materials produced in Comparative Examples 3 and 4 not only had lower strength than the composite material of Example 2 but also experienced very large variations in strength. The fractured surface of each specimen was examined with a scanning electron microscope but no appreciable fiber bundle were observed. However, a Mg-rich area was observed around the interface between the matrix and the composited portion of each of composite materials produced in Comparative Examples 3 and 4, with the Mg content decreasing toward the interior of the composited portion. Therefore, the composite materials of Comparative Examples 3 and 4 had low strength and suffered from great variations in strength for the following probable reasons:. the fibers had a large specific surface area and were low in crystallinity and, therefore, in the compositing process, the fibers would react with light metal components to be damaged to have a lower fiber strength, or alternatively, the light metal components would be segregated to cause variations in the strength of the matrix per se.

Comparative Example 5

High-purity titanium oxide (1400 g) available from Titan Kogyo Kabushiki Kaisha that was of the same kind as used in Example 2 and potassium carbonate (930 g) were weighed. After adding 9 l of water, the mixture was agitated well to have potassium carbonate dissolved. The resulting slurry was spray-dried with the inlet and outlet temperatures being adjusted at 270°–280° C. and 80°–85° C., respectively.

Then, the dried product was put into an alumina crucible and baked in an electric furnace as the temperature was raised to 970° C. at a rate of 250° C./h and held at that temperature for 1 h. Thereafter, the temperature was lowered to 800° C. over 20 minutes and subsequently lowered to room temperature at a rate of 200° C./h.

The baked product was put into 15 l of warm water in a stainless steel container and immersed in it for 5 h. After agitation with a T.K. homomixer (high-shear mixer of Tokushu Kita Kogyo Co., Ltd.) for 1 h, the bath temperature was adjusted to 60° C. By dropwise addition of 5N-HCl, the pH value of the bath was adjusted to 9.5. Upon further agitation, potassium ions would dissolve out from between layers of potassium tetratitanate leading to an increase in the pH value of the bath. Under the circumstances, the pH value was adjusted to 9.5 by adding HCl dropwise at 30-min interval until the pH value would no longer increase by more than 0.1 when agitation was continued for 30 minutes after the dripping of HCl. The potassium titanate fibers were coagulated by adding a polymeric flocculant (available from HYMO Corporation under the trade name "Himolock MP-173H") in an amount of 0.2 wt % of the fibers.

After filtration and washing, the fibers were baked at 1000° C. for 1 h. The baked product was put into 10 l of warm water and stirred with a T.K. homomixer for 30 minutes to disperse the fibers. By adding 1N-HCl dropwise, the of the slurry was adjusted to 4. By subsequent filtration, washing and drying, potassium hexatitanate fibers were obtained. Identification by X-ray diffraction showed that the fibers were single phase of potassium hexatitanate. However, examination with an analytical electron microscope revealed the presence of fibers that were substantially free of potassium. Examination with a scanning electron micrograph showed that the product fibers had an average length of 60 μm and an average diameter of 1 μm. The specific surface area as measured by the BET method was 1.4 m$^2$/g. The crystallite diameter as determined from a (200) diffraction line using the Scherrer equation was 790 Å.

A sintered preform having a fiber volume fraction of 20% was prepared by the same technique as used in Example 1. The prepared sintered preform was preheated at ca. 800° C. and replaced in a metal mold that had been heated at 350° C. A molten of AC 8A (JIS) was poured into the mold at ca. 800° C. and, immediately thereafter, the melt was rapidly cooled to solidify at a controlled pressure of 1000 Kg/cm$^2$, thereby producing a composite material. This composite material was machined to prepare specimens for tensile strength. The shape of the specimens is shown diagrammatically in FIG. 1.

After T6 heat treatment (solution heat treatment at 510° C.×4 h, followed by quenching in water and artificial aging treatment at 170° C.×10 h), the tensile strength of each specimen was measured at ordinary temperatures; the average strength was 393 MPa. However, the Weibull coefficient was 23, indicating great variations in strength. Examination of all specimens at the fractured surface with a scanning electron microscope showed that many aggregates ranging from 10 μm to 30 μm in diameter were present on the fractured surfaces of specimens having the lower strength.

Comparative Example 6

Potassium hexatitanate fibers were obtained by repeating the procedure of Comparative Example 5 except that the pit value of the slurry being subjected to compositional transformation was adjusted to 9.3. Identification by X-ray diffraction showed that the fibers were a two-phase mixture of potassium hexatitanate and titanium dioxide. Examination of the fibers with a scanning electron microscope showed that they had an average length of 60 μm and an average diameter of 1 μm. The specific surface area as measured by the BET method was 1.7 m$^2$/g. The crystallite diameter as determined from a (200) diffraction line using the Scherrer equation was 785 Å.

A sintered preform having a fiber volume fraction of 20% was prepared by the same technique as used in Example 1. The prepared sintered preform was preheated at ca. 800° C. and replaced in a metal mold that had been heated at 350° C. A molten of AC 8A (JIS) was poured into the mold at ca. 800° C. and, immediately thereafter, the melt was rapidly cooled to solidify at a controlled pressure of 1000 Kg/cm$^2$, thereby producing a composite material. This composite material was machined to prepare specimens for tensile strength.

The shape of the specimens is shown diagrammatically in FIG. 1.

After T6 heat treatment (solution heat treatment at 510° C.×4 h, followed by quenching in water and artificial aging treatment at 170° C.×10 h), the tensile strength of each specimen was measured at ordinary temperatures; the average strength was 341 MPa. Further, the Weibull coefficient was 25, indicating great variations in strength. Examination of all specimens at the fractured surface with a scanning electron microscope showed that many aggregates ranging from 10 μm to 40 μm in diameter were present on the fractured surfaces of specimens having low strength.

The test results are shown in Table 4 below.

TABLE 4

| Run | Tensile strength (MPa) | Weibull coefficient |
|---|---|---|
| Comparative Example 5 | 393 | 23 |
| Comparative Example 6 | 341 | 25 |

EXAMPLE 4

15 parts by weight of a sample prepared by treating the surfaces of the potassium hexatitanate fibers of Example 1 with 0.6% γ-glycidyloxypropyl trimethoxysilane and 85 parts by weight of a polybutylene terephthalate resin (available from Polyplastics Co., Ltd. under the trade name "DURANEX 2000") were charged into a twin-screw extruder Model AS-30 of Nakatani Machinery Co., Ltd., where they were melted at 250° C. and blended to be extruded to form pellets.

Comparative Example 7

15 parts by weight of a sample prepared by treating the surfaces of the potassium hexatitanate fibers of Comparative Example 1 with 0.64 γ-glycidyloxypropyl trimethoxysilane and 85 parts by weight of a polybutylene terephthalate resin (available from Polyplastics Co., Ltd. under the trade name "DURANEX 2000") were charged into a twin-screw extruder Model AS-30 of Nakatani Machinery Co., Ltd., where they were melted at 250° C. and blended to be extruded to form pellets.

The pellets obtained in Example 4 and Comparative Example 7 were dried with a vacuum drier at 110° C. for 10 h and injection molded with a Model SAV-30-30 (an injection molding machine manufactured by Sanjo Seiki Co.,Ltd.) with the cylinder and the mold being held at 250° C. and 70° C., respectively, whereby specimens for the measurement of tensile strength and flexural strength were prepared. The results of strength measurements are shown in Table 5.

TABLE 5

| Parameter | Example 4 | Comparative Example 7 |
|---|---|---|
| Tensile strength (Kgf/cm$^2$) | 760 | 680 |
| Flexural strength (Kgf/cm$^2$) | 1360 | 1140 |
| Flexural modulus (Kgf/cm$^2$) | 73200 | 65400 |

EXAMPLE 5

15 parts by weight of a sample prepared by treating the surfaces of the potassium hexatitanate fibers of Example 2 with 0.6% γ-glycidyloxypropyl trimethoxysilane and 85 parts by weight of a polybutylene terephthalate resin (available from Polyplastics Co., Ltd. under the trade name "DURANEX 2000") were charged into a twin-screw extruder Model AS-30 of Nakatani Machinery Co., Ltd., where they were melted at 250° C. and blended to be extruded to form pellets.

The pellets were dried with a vacuum drier at 110° C. for 10 h and injection molded with a Model SAV-30-30 (an injection molding machine manufactured by Sanjo Seiki Co., Ltd.) with the cylinder and the mold being held at 250° C. and 70° C., respectively, whereby specimens for the measurement of tensile strength and flexural strength were prepared. The results of strength measurements are shown in Table 6.

TABLE 6

| Parameter | Example 5 |
|---|---|
| Tensile strength (Kgf/cm$^2$) | 880 |
| Flexural strength (Kgf/cm$^2$) | 1520 |
| Flexural modulus (Kgf/cm$^2$) | 82700 |

EXAMPLE 6

15 parts by weight of a sample prepared by treating the surfaces of the potassium hexatitanate fibers of Example 1 with 0.54 γ-aminopropyl trimethoxysilane and 85 parts by weight of a nylon resin (available from Ube Industries, Ltd. under the trade name "UBE NYLON 20B") were charged into a twin-screw extruder Model AS-30 of Nakatani Machinery Co., Ltd., where they were melted at 280° C. and blended to be extruded to form pellets.

Comparative Example 8

Fifteen parts by weight of a sample prepared by treating the surfaces of the potassium hexatitanate fibers of Comparative Example 1 with 0.5 γ-aminopropyl trimethoxysilane and 85 parts of a nylon resin (available from Ube Industries, Ltd. under the trade name "UBE NYLON 20B") were charged into a twin-screw extruder Model As-30 of Nakatani Machinery Co., Ltd., where they were melted at 280° C. and blended to be extruded to form pellets.

The pellets obtained in Example 6 and Comparative Example 8 were dried with a vacuum drier at 110° C. for 10 h and injection molded with a Model SAV-30-30 (an injection molding machine manufactured by Sanjo Seiki Co., Ltd.) with the cylinder and the mold being held at 280° and 80° C., respectively, whereby specimens for the measurement of tensile strength and flexural strength were prepared. The results of strength measurements are shown in Table 7.

TABLE 7

| Parameter | Example 6 | Comparative Example 8 |
|---|---|---|
| Tensile strength (Kgf/cm$^2$) | 820 | 730 |
| Flexural strength (Kgf/cm$^2$) | 1540 | 1360 |
| Flexural modulus (Kgf/cm$^2$) | 71100 | 61000 |

EXAMPLE 7

Fifteen parts by weight of a sample prepared by treating the surfaces of the potassium hexatitanate fibers of Example 2 with 0.5% γ-amionopropyl trimethoxysilane and 85 parts by weight of a nylon resin (available from Ube Industries, Ltd. under the trade name "UBE NYLON 20B") were charged into a twin-screw extruder Model AS-30 of Nakatani Machinery Co., Ltd., where they were melted at 280° C. and blended to be extruded to form pellets.

The pellets were dried with a vacuum drier at 100° C. for 10 h and injection molded with a Model SAV-30-30 (an injection molding machine manufactured by sanjo seiki Co., Ltd.) with the cylinder and the mold being held at 280° C. and 80° C., respectively, whereby specimens for the measurement of tensile strength and flexural strength were prepared. The results of strength measurements are shown in Table 8.

TABLE 8

| Parameter | Example 7 |
|---|---|
| Tensile strength (Kgf/cm$^2$) | 1030 |
| Flexural strength (Kgf/cm$^2$) | 1830 |
| Flexural modulus (Kgf/cm$^2$) | 83200 |

EXAMPLE 8

Titanium oxide (1400 g) produced by Titan Kogyo Kabushiki Kaisha and potassium carbonate (740 g) were dry-mixed and the blend was put into an alumina crucible, baked in an electric furnace as the temperature was raised to 930° C. at a rate of 200° C./h and held at that temperature for 3 h. Thereafter, the temperature was lowered at a rate of 150° C./h.

The baked product was put into 10 l of warm water in a stainless steel vessel and immersed in it for 5 h. Thereafter, agitation was started at 600 rpm and the temperature of the bath was adjusted to 60° C. by dropwise addition of 5N-HCl, the pH value of the bath was adjusted to 9.5. Upon further agitation, potassium ions would dissolve out from between layers of potassium tetratitanate, leading to an increase in tile pH value of the bath. Under the circumstances, the pH value was adjusted to 9.5 by adding HCl dropwise at 30-min intervals until the pH value would no longer increase by more than 0.1 when agitation was continued for 30 minutes after the dripping of HCl.

After filtration, baking was conducted at 1000° C. for 2 h. the baked product was dispersed in 10 l of warin water and, thereafter, 1N-HCl was added to adjust the pH value to 4. by subsequent filtration, washing and drying, high-grade potassium hexatitanate whiskers were obtained. Identification by X-ray diffraction showed that the whiskers were composed of a single phase of potassium hexatitanate having a tunnel structure. Examination with a scanning electron microscope showed that the product whiskers had an average length of 16 μm and an average diameter of 0.4 μm.

By chemical analysis, the potassium titanate whiskers were found to contain various impurities such as 0.024% $Nb_2O_5$, 0.013% $Al_2O_3$, 0.006% $Fe_2O_3$, 0.009% MgO, 0.085% CaO, 0.012% ZnO, 0.008% $P_2O_5$ and 0.006% $SiO_2$. The purity of the whiskers was 99.8%. The molar ratio of $TiO_2/K_2O$ was 6.0.

20 parts of a sample prepared by treating the surfaces of those potassium titanate whiskers with 0.7% γ-aminopropyl trimethoxysilane and 80 parts of a nylon 66 resin (available from Ube Industries, Ltd. under the trade name "UBE NYLON 2020B") were charged into a twin-screw extruder Model AS-30 of Nakatani Machinery Co., Ltd., where they were melted at 280° C. and blended to be extruded to form pellets.

Comparative Example 9

Titanium oxide in anatase form (1400 g, KA-10 of titan Kogyo Kabushiki Kaisha) and potassium carbonate (740 g) were dry-mixed and the blend was put into an alumina crucible, baked in an electric furnace as the temperature was raised to 990° C. at a rate of 250° C./h and held at that temperature for 1 h. Thereafter, the temperature was lowered at a rate of 200° C./h. The baked product was put into 10 l of warm water in a stainless steel container and immersed in it for 5 h. Thereafter, agitation was started at 600 rpm and the temperature of the bath was adjusted to 60° C. By dropwise addition of 5N-HCl, the pH value of the bath was adjusted to 9.5. Upon further agitation, potassium ions would dissolve out from between layers of potassium titanate, leading to an increase in the pH value of the bath. Under the circumstances, the pH value was adjusted to 9.5 by adding HCl dropwise at 30-min intervals until the pH would no longer increase by more than 0.1 when agitation was continued for 30 minutes after the dripping of HCl.

After filtration, baking was conducted at 1000° C. for 2 h. The baked product was dispersed in 10 l of warm water and, thereafter, 1N-HCl was added to adjust the pH value to 4. by subsequent filtration, washing and drying, high-grade potassium hexatitanate whiskers were obtained. Identification by X-ray diffraction showed that the whiskers were composed of a single phase of potassium hexatitanate having a tunnel structure. Examination with a scanning electron microscope showed that the product whiskers had an average length of 15 $\mu$m and an average diameter of 0.4 $\mu$m.

By chemical analysis, the potassium titanate whiskers were found to contain various impurities such as 0.353% $Nb_2O_5$, 0.015% $Al_2O_3$, 0.009% $Fe_2O_3$, 0.010% MgO, 0.106% CaO, 0.012% ZnO, 0.009% $P_2O_5$ and 0.006% $SiO_2$. The purity of the whiskers was 99.3%. The molar ratio of $TiO_2$ to $K_2O$ was 6.0.

20 parts of a sample prepared by treating the surfaces of those potassium titanate whiskers with 0.74 $\gamma$-aminopropyl trimethoxysilane and 80 parts of a nylon 66 resin (available from Ube Industries, Ltd. under the trade name "UBE NYLON 2020B") were charged into a twin-screw extruder Model AS-30 of Nakatani Machinery Co., Ltd., where they were melted at 280° C. and blended to be extruded to form pellets.

The pellets obtained in Example 8 and Comparative Example 9 were dried with a vacuum drier at 120° C. for 12 h and injection molded with a Model SAV-30-30 (an injection molding machine manufactured by Sanjo Seiki Co., Ltd.) with the cylinder and the mold being held at 280° C. and 80° C., respectively, whereby specimens for the measurement of tensile strength and flexural strength were prepared. The results of strength measurements are shown in Table 9.

TABLE 9

| Parameter | Example 8 | Comparative Example 9 |
|---|---|---|
| Tensile strength (Kgf/cm$^2$) | 1230 | 1010 |
| Flexural strength (Kgf/cm$^2$) | 2230 | 1780 |
| Flexural modulus (Kgf/cm$^2$) | 97000 | 81000 |

Potassium titanate whiskers were extracted from the specimens and their average length was measured; it was 7.6 $\mu$m for the specimen prepared in Example 8 and 7.7 $\mu$m for the specimen prepared in Comparative Example 9. There was no particular difference in length between the potassium titanate whiskers in the two specimens.

EXAMPLE 9

High-grade potassium hexatitanate whiskers were synthesized under the same conditions as in Example 8 except that the temperature for baking that was effected after removing part of potassium from between layers of potassium tetratitanate whiskers was changed from 1000° C. to 950° C. The thus obtained potassium titanate whiskers had the same purity and composition as in Example 8.

20 Parts of a sample prepared by treating the surfaces of the potassium titanate whiskers with 0.6% $\gamma$-glycidyloxypropyl trimethoxysilane and 80 parts of a polyacetal resin (available from Polyplastics Co., Ltd. under the trade name "DURACON M90") were charged into a twin-screw extruder Model AS-30 of Nakatani Machinery Co., Ltd., where they were melted at 220° C. and blended to be extruded to form pellets.

Comparative Example 10

Potassium hexatitanate whiskers having a tunnel structure were synthesized under the same conditions as in Example 7 except that titanium oxide in anatase form (KV-200) was used as the titanium feed compound. Examination with a scanning electron microscope showed that the whiskers had an average length of 15 $\mu$m and an average diameter of 0.4 $\mu$m. By chemical analysis, the potassium titanate whiskers were found to contain various impurities such as 0.132% $Nb_2O_5$, 0.014% $Al_2O_3$, 0.008% $Fe_2O_3$, 0.009% MgO, 0.101% CaO, 0.010% ZnO, 0.010% $P_2O_5$, and 0.007% $SiO_2$. The purity of the whiskers was 99.6%. The molar ratio of $TiO_2$ to $K_2O$ was 6.0.

20 parts of a sample prepared by treating tile surfaces of the potassium titanate whiskers with 0.6% $\gamma$-glycidyloxypropyl trimethoxysilane and 80 parts of a polyacetal resin (available from Polyplastics Co., Ltd. under the trade name "DURACON M90") were charged into a twin-screw extruder Rodel AS-30 of Nakatani Machinery Co., Ltd., where they were melted at 220° C. and blended to be extruded to form pellets.

The pellets obtained in Example 9 and Comparative Example 10 were dried with a vacuum drier at 110° C. for 10 h and injection molded with a Model SAV-30-30 (an injection molding machine manufactured by Sanjo Seiki Co., Ltd.) with the cylinder and the mold being held at 200°-210° C. and 80° C., respectively, whereby specimens for the measurement of tensile strength and flexural strength were prepared. The results of strength measurements are shown in Table 10. Potassium titanate whiskers were extracted from the specimens and their length was measured; there was no particular difference in length between the potassium titanate whiskers in the two specimens.

TABLE 10

| Parameter | Example 9 | Comparative Example 10 |
|---|---|---|
| Tensile strength (Kgf/cm$^2$) | 1260 | 950 |
| Flexural strength (Kgf/cm$^2$) | 2090 | 1600 |
| Flexural modulus (Kgf/cm$^2$) | 107000 | 78000 |

EXAMPLE 10

15 parts of the potassium titanate whiskers used in Example 8 (as treated with 0.6% $\gamma$-glycidyloxypropyl methoxysilane) and 85 parts of a polycarbonate resin (available from Mitsubishi Gas Chemical Company Inc. under the trade name "Iupilon S-2000") were charged into a twinscrew extruder Model AS-30 of Nakatani Machinery Co., Ltd., where they were melted at 280° C. and blended to be extruded to form pellets.

Comparative Example 11

15 parts of the potassium titanate whiskers used in Comparative Example 9 (as treated with 0.6% γ-glycidyloxypropyl trimethoxysilane) and 85 parts of a polycarbonate resin (available from Mitsubishi Gas Chemical Company Inc. under the trade name "Iupilon S-2000") were charged into a twin-screw extruder Model AS-30 of Nakatani Machinery Co., Ltd., where they were melted at 280° C. and blended to be extruded to form pellets.

The pellets obtained in Example 10 and Comparative Example 11 were injection molded with a Model SAV-30-30 (an injection molding machine manufactured by Sanjo Seiki Co., Ltd.) with the cylinder and the mold being held at 290° C. and 90° C., respectively, whereby specimens for the measurement of tensile strength and flexural strength were prepared. The results of strength measurements are shown in Table 11. Potassium titanate whiskers were extracted from the specimens and their length was measured; there was no particular difference in length between the potassium titanate whiskers in the two specimens.

TABLE 11

| Parameter | Example 10 | Comparative Example 11 |
|---|---|---|
| Tensile strength (Kgf/cm$^2$) | 970 | 780 |
| Flexural strength (Kgf/cm$^2$) | 1740 | 1350 |
| Flexural modulus (Kgf/cm$^2$) | 88500 | 69000 |

EXAMPLE 11

20 parts of a sample prepared by treating the surfaces of the potassium hexatitanate whiskers of Example 9 with 0.5% γ-glycidyloxypropyl trimethoxysilane and 80 parts of a polybutylene terephthalate resin (available from Polyplastics Co., Ltd. under the trade name "DURANEX 2000") were charged into a twin-screw extruder Model AS-30 of Nakatani Machinery Co., Ltd., where they were melted at 250° C. and blended to be extruded to form pellets.

Comparative Example 12

20 parts of a sample prepared by treating the surfaces of the potassium hexatitanate whiskers of Comparative Example 10 with 0.5% γ-glyeidoxypropyl trimethoxysilane and 80 parts of a polybutylene terephthalate resin (available from Polyplastics Co., Ltd. under the trade name "DURANEX 2000") were charged into a twin-screw extruder Model AS-30 of Nakatani Machinery Co., Ltd., where they were melted at 250° C. and blended to be extruded to form pellets.

The pellets obtained in Example 11 and Comparative Example 12 were injection molded with a Model SAV-30-30 (an injection molding machine manufactured by Sanjo Seiki Co., Ltd.) with the cylinder and the mold being held at 250° C. and 70° C., respectively, whereby specimens for the measurement of tensile strength and flexural strength were prepared. The results of strength measurements are shown in Table 12. Potassium titanate whiskers were extracted from the specimens and their length was measured; there was no particular difference in length between the potassium titanate whiskers in the two specimens.

TABLE 12

| Parameter | Example 11 | Comparative Example 12 |
|---|---|---|
| Tensile strength (Kgf/cm$^2$) | 1050 | 810 |
| Flexural strength (Kgf/cm$^2$) | 2030 | 1570 |
| Flexural modulus (Kgf/cm$^2$) | 105500 | 79500 |

EXAMPLE 12

7 parts of the potassium hexatitanate whiskers obtained in Example 8 and 93 parts of a polypropylene resin (available from Ube Industries, Ltd. under the trade name "UBE POLYPRO J709HK") were charged into a twin-screw extruder Model AS-30 of Nakatani Machinery Co., Ltd., where they were melted at 220° C. and blended to be extruded to form pellets.

Comparative Example 13

7 parts of the potassium hexatitanate whiskers obtained in Comparative Example 9 and 93 parts of a polypropylene resin (available from Ube Industries, Ltd. under the trade name "UBE POLYPRO J709HK") were charged into a twin-screw extruder Model AS-30 of Nakatani Machinery Co., Ltd., where they were melted at 220° C. and blended to be extruded to form pellets.

The pellets obtained in Example 12 and Comparative Example 13 were injection molded with a Model SAV-30-30 (an injection molding machine manufactured by SanJo Seiki Co., Ltd.) with the cylinder and the mold being held at 220° C. and 80° C., respectively, whereby specimens for the measurement of tensile strength and flexural strength were prepared. The results of strength measurements are shown in Table 13. Potassium titanate whiskers were extracted from the specimens and their length was measured; there was no particular difference in length between the potassium titanate whiskers in the two specimens.

TABLE 13

| Parameter | Example 12 | Comparative Example 13 |
|---|---|---|
| Tensile strength (Kgf/cm$^2$) | 430 | 300 |
| Flexural strength (Kgf/cm$^2$) | 490 | 410 |
| Flexural modulus (Kgf/cm$^2$) | 16000 | 17500 |

What is claimed is:

1. Reinforcement potassium hexatitanate fiber having an average fiber length of 8–30 μm, an average fiber diameter of 0.2–0.7 μm and a specific surface area of 2–4 m$^2$/g.

2. Potassium hexatitanate fibers according to claim 1 which have a total impurity content of no more than 0.3 wt %.

3. Potassium hexatitanate fibers according to claim 2 wherein the content of niobium as an impurity is no more than 0.1 wt % as calculated for Nb$_2$O$_5$.

4. A composite material comprising the reinforcement potassium hexatitanate fibers of claim 1 and a light alloy or thermoplastic resin matrix.

5. A composite material comprising the reinforcement potassium hexatitanate fibers of claim 2 and a light alloy or thermoplastic resin matrix.

6. A composite material comprising the reinforcement potassium hexatitanate fibers of claim 3 and a light alloy or thermoplastic resin matrix.

7. A process for producing reinforcement potassium hexatitanate fibers having an average fiber length of 8–30 μm, an average fiber diameter of 0.2–0.7 μm and a specific surface area of 2–4 m$^2$/g which comprises the steps of:

baking at 950°–1100° C. a mixture of titanium and potassium feed compounds that are blended at such proportions as to give the general formula $K_2O \cdot nTiO_2$ where n=3.5–4, whereby masses of potassium tetratitanate fibers are produced:

then cooling said baked masses down to 800° C. within a time period of 30 minutes:

dipping said baked masses in cold or warm water:

disintegrating said masses of potassium titanate fibers into individual single fibers by means of a high-shear mixer;

adding an acid to the slurry of the individual single fibers so as to adjust its pH value to 9.2–9.5, whereby the composition of the potassium titanate fibers is transformed in such a way that the molar ratio of $TiO_2/K_2O$ lies between 5.95 and 6.00;

subsequently, adding a polymeric glocculant so as to coagulate the fibers, which are then subjected to solid-liquid separation:

baking the solids content at 950°–1050° C.; and washing the baked product with an acid.

8. A composite material comprising the potassium hexatitanate fibers of claim 1 and a light alloy.

* * * * *